United States Patent [19]

Schmitt et al.

[11] 3,852,407

[45] Dec. 3, 1974

[54] METHOD FOR REMOVING ALKYL IODIDES FROM AIR BY MERCURIC NITRATE SOLUTION

[75] Inventors: John M. Schmitt; David J. Crouse, Jr.; William B. Howerton, Oak Ridge, all of Tenn.

[73] Assignee: The United States of America as represented by the United States Atomic Energy Commission, Washington, D.C.

[22] Filed: Aug. 8, 1972

[21] Appl. No.: 278,842

[52] U.S. Cl................ 423/240, 423/101, 423/241, 423/245, 423/475
[51] Int. Cl.. C01b 11/72, C01b 11/12, C01g 13/04
[58] Field of Search .......... 423/240, 241, 245, 462, 423/465, 99, 101, 104, 475

[56] References Cited
UNITED STATES PATENTS

| | | | |
|---|---|---|---|
| 3,018,159 | 1/1962 | Silverman | 423/241 |
| 3,378,337 | 4/1968 | Bach | 423/475 X |
| 3,429,655 | 2/1969 | Case | 423/241 |
| 3,466,137 | 9/1969 | Ward et al. | 423/241 |
| 3,658,467 | 4/1972 | Maeck | 423/240 |
| 3,715,316 | 2/1973 | Soldano | 423/245 X |
| 3,752,876 | 8/1973 | Cathers et al. | 423/240 |

*Primary Examiner*—Earl C. Thomas
*Assistant Examiner*—Gary P. Straub
*Attorney, Agent, or Firm*—John A. Horan; David S. Zachry; John B. Hardaway

[57] ABSTRACT

An improved process for contacting and removing iodine and particularly alkyl iodides from an air stream comprising the use of a relatively concentrated nitric acid solution comprising mercuric ions recycled through a gas contactor. Concurrently, a minor fraction of the solution is passed through an evaporator to oxidize and concentrate the accumulated iodine causing it to precipitate as mercuric iodate, thereby allowing essentially complete recycle of the mercury and nitric acid.

9 Claims, 3 Drawing Figures

METHOD FOR REMOVING ALKYL IODIDES FROM AIR BY MERCURIC NITRATE SOLUTION

BACKGROUND OF THE INVENTION

The present invention was made in the course of, or under, a contract with the United States Atomic Energy Commission. It relates generally to a process for decontaminating effluents from the processing of irradiated nuclear fuels and in particular to a method for removing iodine species, particularly alkyl iodides, from an air stream containing fuel fission product gases.

Prior art process have attempted the decontamination of air streams containing radioactive iodine by many techniques. One such technique employed the use of a mercuric nitrate-nitric acid solution at molarities of about 0.1 and 0.1, respectively. Although the mercury scrubbing process is known to remove elemental iodine effectively from air streams, removal of alkyl iodides, such as methyl iodide, has been shown to be inefficient in practical contacting equipment except at unpractically low gas flow rates. Since a significant fraction of the iodine in off-gases from fuel reprocessing plants is invariably in the form of alkyl iodides, efficient removal of these species is needed to provide a high overall iodine decontamination efficiency. Another hindrance to the use of a mercury scrubbing process has been the toxic nature of mercury.

Another prior art method for removing alkyl iodides from air streams, S. N. 175,352, now U.S. Pat. No. 3,752,876, commonly assigned herewith, involves contacting the air stream with boiling, concentrated nitric acid in a reflux system wherein the organic iodides are decomposed and the iodine is oxidized and held in solution in the iodate form. The reflux system is controlled to permit the escape of nitrite-forming oxides of nitrogen which would otherwise reduce some iodate to free iodine and cause loss by volatilization. A disadvantage in that method lies in the critical control of the reflux system to prevent these losses of elemental iodine. Also, iodine in this system is highly corrosive and the ordinary materials of construction (stainless steels) cannot be used.

SUMMARY OF THE INVENTION

It is thus an object of this invention to provide an improved process for the absorption of alkyl iodides from an air stream.

It is a further object to provide a process wherein the absorbing constituents, particularly mercuric ion, can be recycled and contained within the system and the iodine can be removed therefrom.

These and other objects are accomplished by a process wherein an air stream contaminated with radioactive iodine is contacted with a nitric acid solution of 6 to 14 molar concentration containing mercuric ions at a concentration of at least 0.1 molar. A small portion of the solution is separated and evaporated severalfold to oxidize the iodine and precipitate mercuric iodate for removal from the system; the distillate along with filtrate after precipitate removal is recycled to the contacting step. In another embodiment the solution is maintained under reflux conditions prior to recycling to convert sorbed iodide to iodate.

DETAILED DESCRIPTION

Figure 1:
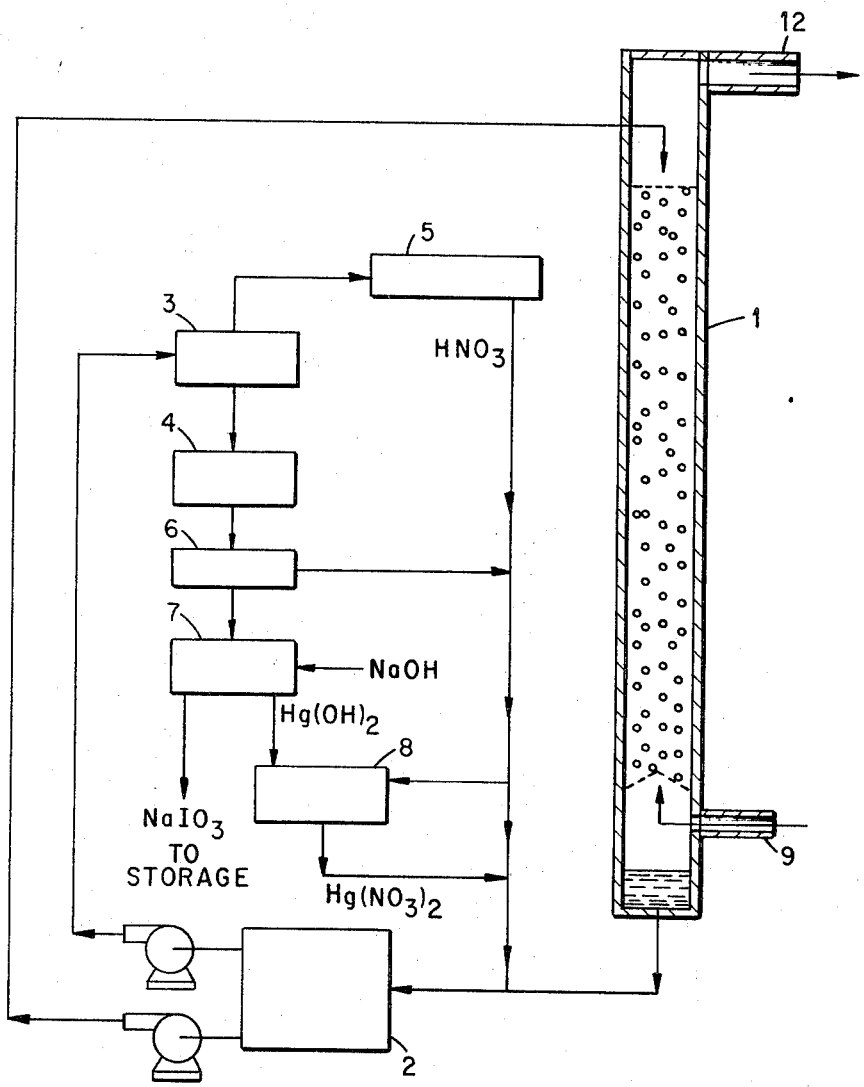
FIG. 1 is a flow chart of the first embodiment of this invention.

According to the present invention, air contaminated with $I_2$ and alkyl iodides is contacted countercurrently with a solution of nitric acid at a concentration of from about 6 to 14 but preferably from about 8 to 10 molar and at least 0.1 but preferably 0.2 to 0.6 molar in $Hg(NO_3)_2$ at a temperature of from 25 to 80°C and preferably about 25°C in a packed vertical column or in a bubble-cap or sieve-plate column. Column packing can be either ceramic berl saddles or preferably protruded, perforated stainless steel. The aqueous effluent from contacting column 1 accumulates in a surge tank 2, where a portion of the effluent is pumped back to the top of column 1. To remove accumulated iodine, a fraction of from about 1 to 15% of the effluent stream is evaporated in evaporator 3 to oxidize and concentrate the iodine, thereby causing precipitation of most of the iodine as mercuric iodate. The mercuric iodate is somewhat slow in precipitating. In practice, it is satisfactory to allow the evaporated solution to remain in decanter 4 for about 3 hours at ambient temperature to allow precipitation to approach completion. After precipitation the mixture is fed to filter 6. Under these conditions, the concentration of iodine in the supernatant solution is typically about 0.2 g/liter. Fumes from evaporator 3 are fed to condenser 5. The nitric acid from condenser 5 and the supernate (mercuric nitrate—nitric acid solution) from the filter 6 are recycled to surge tank 2. The mercuric iodide precipitate can be stored as such or can be reacted with caustic in reactor 7 to form sodium iodate (for storage) and mercuric hydroxide. The latter can be dissolved in nitric acid in container 8 to provide complete mercury recycle. The rate at which solution is fed to the evaporator is dependent on the rate at which iodine enters the system in the incoming gas at source 9 and the desired iodine concentration in the solution being recycled to the top of the column. In practice the aqueous feed rate to the evaporator is usually set so that, at steady-state, the iodine concentration in the recycle solution is in the range of 0.1 to 0.3 g/liter. The flow of solution through the column relative to the gas flow is not critical. Usually the solution pumping rate, on a volume basis, is maintained at 0.3 to 2% of the gas flow.

Figure 2:
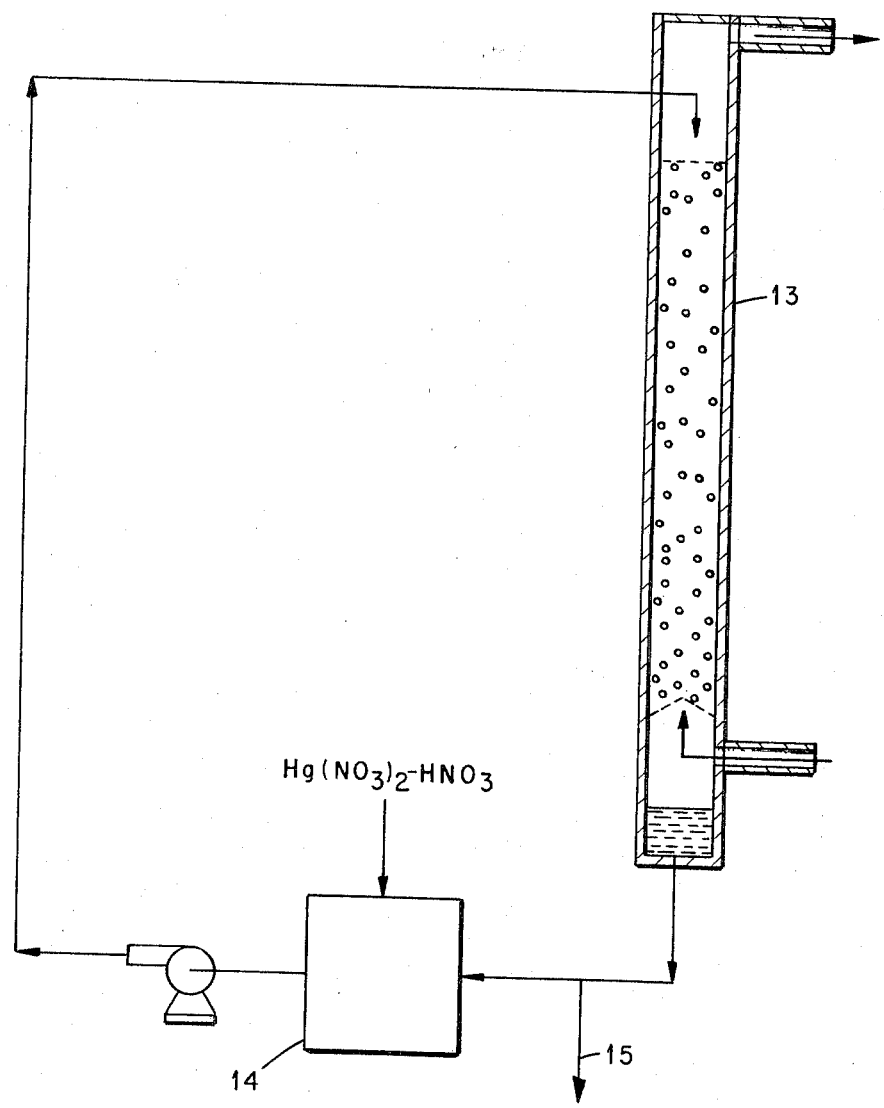
FIG. 2 is a flow chart of an alternative process which may be carried out with the first embodiment.

The system as shown in FIG. 1 provides very efficient removal of various iodine species including elemental iodine, methyl iodide, and other organic iodides, such as butyl iodide from gas streams. Typically iodine decontamination factors when operating at gas flow rates (face velocity to the column) of 25 to 50 ft/min. are higher than $10^3$. As an alternative, it has been found desirable to use a second column in series with the first since there is some tendency for a very small fraction of the accumulated iodine in the solution pumped to the top of the first column to "bleed off," i.e., decompose, into the gas stream leaving the column. The system shown in FIG. 2 is similar to that illustrated in FIG. 1. It has an inlet 10 connected to exhaust outlet 12 of the primary system illustrated in FIG. 1. The inlet flow passes through a packed column 13 where it contacts an aqueous solution of mercuric nitrate and nitric acid at a concentration of about 0.02 M and 0.1 M, respectively. It may also contain a small amount (about 0.01 M) of nonradioactive iodine for reasons described below. This solution is passed through surge tank 14 for recycling to the top of column 13. A portion of from about 0.2 to 2% by volume of the contaminated solution (relative to the volume of gas processed) may be fed through outlet 15 to surge tank 2 of FIG. 1 for decontamination. Since some nitric acid vapors transfer to the gas stream as it passes through the first column, the second scrub column serves to remove this nitric acid from the gas stream and to remove most of the iodine, thereby increasing the overall iodine decontamination efficiency. It has also been found that the addition of a low concentration of nonradioactive iodine to the solution in the second column increases the efficiency of retention of radioactive iodine by that solution due to an isotopic dilution effect. An iodine addition of about 5 to 50 mg/liter has been found to be beneficial. The aqueous feed to the second column is very dilute mercuric nitrate--nitric acid solution, about 0.005 to 0.02 and 0.1 to 1 molar, respectively.

In general the process of this invention involves the following steps:

1. Contacting an air stream with a nitric acid solution at least 6 M in concentration, comprising mercuric ion in at least 0.1 M concentration, at a temperature of about 25 to 80°C to absorb elemental iodine and alkyl iodides from the air stream and convert them to a mercury-iodine complex;
2. Recycling a major fraction of the effluent from the column back to the air contacting step;
3. Evaporating a minor fraction of the column effluent to concentrate mercuric iodate in solution and to cause precipitation of mercuric iodate therein;
4. Condensing the vapors from the evaporation step and returning the resulting condensate to the solution recycle system;
5. Separating the supernatant liquid from the precipitate and returning it to the solution recycle system;
6. Removing the iodine from the system as comparatively insoluble mercuric iodate;

and optionally the following steps

7. Contacting the mercuric iodate precipitate with caustic solution to convert the iodine to sodium iodate for storage and mercuric hydroxide;
8. Dissolution of the mercuric hydroxide in nitric acid and return of the mercuric nitrate thus formed to the scrub system; and
9. Contacting the gas stream leaving the scrub column with very dilute mercuric nitrate--nitric acid solution that contains dissolved nonradioactive $I_2$ in a second column to remove nitric acid and small amounts of iodine.

Figure 3:
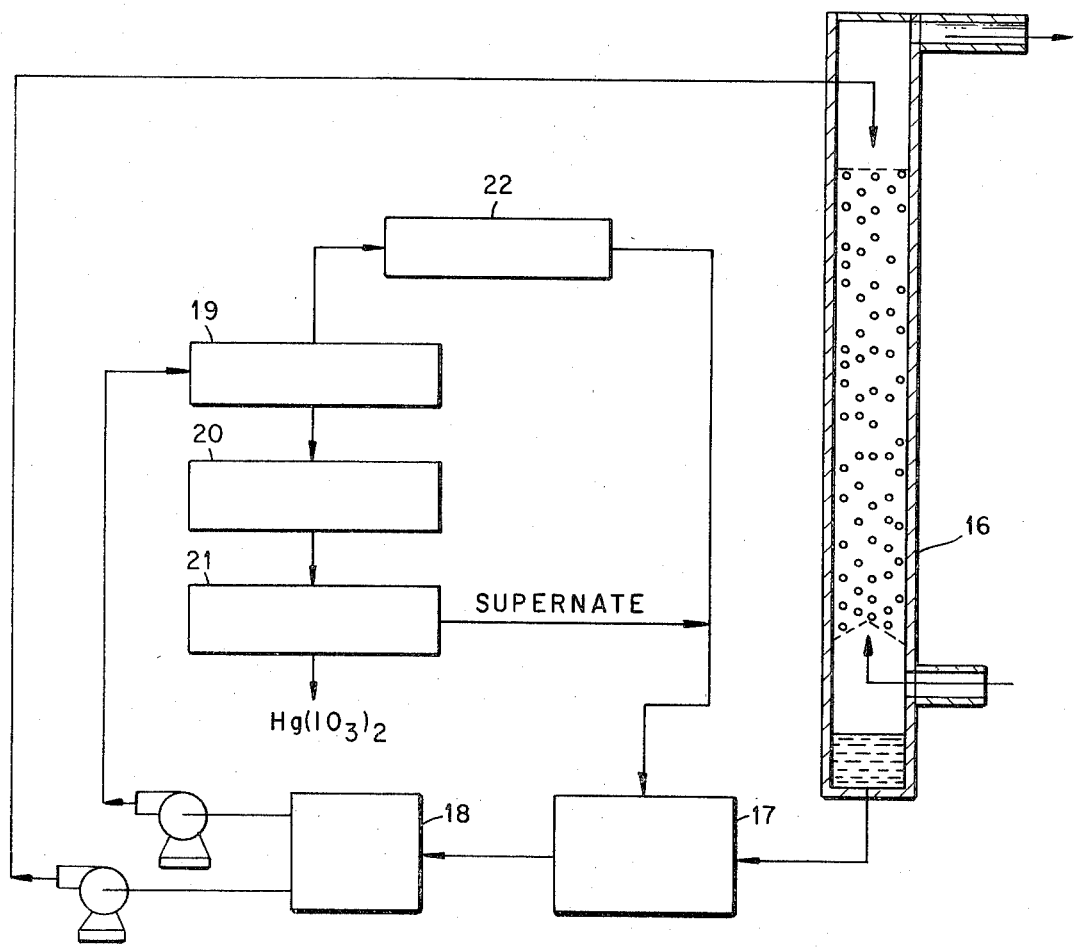
FIG. 3 is a flow chart of another embodiment of this invention.

Another embodiment of this invention is ilustrated in FIG. 3. This embodiment differs from the embodiment of FIG. 1 in that the mercuric nitrate--nitric acid solution is boiled under reflux conditions after leaving the contacting column. This embodiment comprises a contacting column 16, a reflux converter 17, a surge tank 18, and evaporator 19, a decanter 20, a filter 21 and a condenser 22.

The solution from the contactor 16 is held at boiling temperature under reflux conditions to convert the dissolved iodine species to a stable mercuric iodate complex. The rate of this reaction is temperature dependent to a degree such that the practical temperature of choice is at boiling. The solution boils at about 110°C. In 14 M $HNO_3$–0.1 M $Hg(NO_3)_2$ solution, all of (initially) 0.01 M iodide ion is converted to iodate ion in the 10 minutes required to heat the solution to reflux temperature. In 12 M $HNO_3$ at reflux temperature the conversion is about 94% complete in 15 minutes and 90% complete in 30 minutes. In 10 M $HNO_3$ about 4 hours is required at boiling temperature for complete conversion.

In general the process of this embodiment involves the following steps:

1. Contacting an air stream with a nitric acid solution at least 6 M in concentration, comprising mercuric ion in at least 0.1 M concentration, at a temperature of about 25 to 50°C to absorb elemental iodine and alkyl iodides from the air stream and convert them to a mercury-iodine complex;
2. Heating the solution from the air-contacting step at boiling temperature for at least 10 minutes to convert all iodine species to the iodate form;
3. Recycling a major fraction of the converted solution to the air contacting step;
4. Evaporating a minor fraction of the converted solution to concentrate mercuric iodate in solution and to cause precipitation of mercuric iodate therein;
5. Condensing the vapors from the evaporation step and returning resulting condensate to the conversion step;
6. Separating the supernatant liquid from the precipitate and returning it to the conversion step; and
7. Removing the iodine from the system as comparatively insoluble mercuric iodate.

The processs of this second embodiment is not, however, as satisfactory as the process of the first embodiment in the presence of organic vapors, since the iodate tends to decompose in the presence of the organic vapors (e.g., hydrocarbons).

As an aid to understanding the invention the following illustrative examples are given.

EXAMPLE I

Referring to FIG. 1, air containing 0.1 mg/liter of $^{131}I$-tagged methyl iodide was passed through a packed column countercurrent to a mercuric nitrate--nitric acid solution. The column was 1 inch in diameter with various depths of stainless steel packing. The aqueous effluent from the column was recycled to the top of the column as shown. A series of runs was made with different solution and gas flow conditions and with different depths of packing. In these particular runs, the evaporator and associated system for removing the iodine from solution were not operated; rather the scrub solution was partially replaced with fresh scrub solution at periodic intervals to prevent excessive accumulation of iodine in the system. Table I shows the results of the tests. High iodine decontamination factors were obtained at high gas flow rates with solutions contianing from 8 to 14 M $HNO_3$. The gas throughput capacity for a given decontamination performance increased as the acid concentration was increased.

TABLE I

| Run No. | Scrub Solution | Depth of Packing (in.) | Flow (liters/min.) Air | Flow (liters/min.) Solution | Temp. (°C) | Iodine Decontamination Factor |
|---|---|---|---|---|---|---|
| 1 | 0.2 M Hg(NO$_3$)$_2$–14 M HNO$_3$ | 36 | 5 | 0.03 | 25 | $3 \times 10^5$ |
| 2 |  | 36 | 10 | 0.03 | 25 | $3 \times 10^4$ |
| 3 | 0.2 M Hg(NO$_3$)$_2$–12 M HNO$_3$ | 36 | 1 | 0.03 | 25 | $4 \times 10^4$ |
| 4 |  | 36 | 5 | 0.03 | 25 | $8 \times 10^3$ |
| 5 |  | 36 | 5 | 0.03 | 45 | $1.7 \times 10^4$ |
| 6 | 0.4 M Hg(NO$_3$)$_2$–10 M HNO$_3$ | 30 | 3 | 0.03 | 25 | $8.5 \times 10^3$ |
| 7 |  | 30 | 5 | 0.03 | 25 | 259 |
| 8 |  | 66 | 6.5 | 0.03 | 25 | $1.5 \times 10^4$ |
| 9 |  | 66 | 8 | 0.03 | 25 | 2220 |
| 10 | 0.4 M Hg(NO$_3$)$_2$–8 M HNO$_3$ | 66 | 5 | 0.03 | 25 | 2100 |
| 11 |  | 66 | 3 | 0.03 | 25 | $6.5 \times 10^4$ |

EXAMPLE II

A series of 6-hour runs was made on scrubbing iodine species from air contaminated with 0.1 mg/liter of methyl iodide or elemental iodine. A scrub solution of 0.2 M Hg(NO$_3$)$_2$–14 M HNO$_3$ was used in the first column. A two-column system, with removal of Hg(IO$_3$)$_2$ for storage, was used as shown in FIGS. 1 and 2. The columns were 1 inch in diameter with 3 feet of stainless steel packing. Decontamination factors for methyl iodide and elemental iodine were in the range of $10^4$ and higher at air flow rates of 5 to 10 liters/min. In all runs, the scrub solution in the first column was 0.2 M Hg(NO$_3$)$_2$–14 M HNO$_3$ and the solution flow was about 30 ml/min; the effluent from this column was recycled to the top of the scrub column. About 4 ml/min of this recycle solution was routed through an evaporator to precipitate iodine from the solution as mercuric iodate. The iodine in the solution was concentrated by a factor of 6–7 in passing through the evaporator. The solution withdrawn from the evaporator was cooled to room temperature and let stand for 2 to 3 hours to allow Hg(IO$_3$)$_2$ precipitation. The precipitate settled rapidly and the supernatant solution was easily decanted and recycled to the scrub system.

The solution makeup for the second column was 0.015 M Hg(HNO$_3$)$_2$– 0.006 M HNO$_3$ solution. This column serves to remove nitric acid from the air stream and to trap iodine that "bleeds off" from the first column. At the end of each run, 50 to 100 ml of the solution in the column was removed and replaced with fresh solution. The results are summarized in Table II.

TABLE II

| Iodine Species in Air Stream | Air Flow (liters/min) | Temp. in First Column | Iodine Decontamination Factor First Column | Iodine Decontamination Factor Second Column | Iodine Decontamination Factor Overall |
|---|---|---|---|---|---|
| CH$_3$I | 5 | 80 | $1.7 \times 10^3$ | 32 | $5.3 \times 10^4$ |
| I$_2$ | 5 | 80 | $9 \times 10^2$ | 11 | $9.8 \times 10^3$ |
| I$_2$ | 5 | 40 | $1.8 \times 10^3$ | 6.5 | $1.2 \times 10^4$ |

EXAMPLE III

Referring to FIG. 3, air containing 0.1 mg/liter of $^{131}$I-tagged methyl iodide was passed at the rate of 5 liters/min. through a 3-foot packed column countercurrent to 20–30 ml/min. of 0.2 M Hg(NO$_3$)$_2$–14 M HNO$_3$ solution. The effluent scrub solution passed through a flask (converter) with reflux condenser where it was heated to boiling for 20–25 min. before being recycled to the top of the column. Ten to twenty percent of the recycle stream was routed through an evaporator to concentrate the solution and precipitate mercuric iodate for storage. For the conditions chosen, the iodine concentration in the recycle stream at steady-state was in the range of 0.12 to 0.18 g/liter. In the first 13 hours of operation, during which the iodine slowly accumulated in the solution to the steady-state level, the iodine decontamination factor was $1.1 \times 10^4$. The decontamination factor over the next 12 hours, however was only $2.3 \times 10^3$. Analysis of the recycle solution at about 4 hours before the end of this period of operation showed that the acid concentration had decreased to 13.1 M which may have caused at least part of the loss in efficiency; the acid concentration was adjusted to 14 M with fuming nitric acid for the balance of the run. In these runs, the scrub column was not heated. A 12 hour run was then made in which the water in the jacket surrounding the column was at 90°C. The decontamination factor for this run was about $6 \times 10^3$.

EXAMPLE IV

A series of 6-hour runs was made on scrubbing 0.1 mg/liter of radioactive iodine species from air with mercuric nitrate-nitric acid solutions in a 1 inch diameter packed column. The equipment and method of operation of the system were essentially those described in Example III. Decontamination factors for methyl iodide were in the range of $10^4$ and higher at air flow rates of 5–10 liters/min. In all runs, the scrub solution was 0.2 M Hg(NO$_3$)$_2$–14–15 M HNO$_3$ and the solution flow was about 30 ml/min.; the effluent from the column was heated to boiling to convert the iodine in the solution to the iodate form before the solution was recycled to the top of the scrub column. About 4 ml/min. of this recycle solution was routed through an evaporator to precipitate iodine from the solution as mercuric iodate. In addition, a second packed scrub column was used in series with the first column for these runs. The solution makeup for the second column was 0.015 Hg(HNO$_3$)$_2$– 0.006 M HNO$_3$ solution. This column serves to remove nitric acid from the air stream and to trap iodine that "bleeds off" from the first column. At the end of each run, 50–100 ml of the solution in the column was removed and replaced with fresh solution. The results are summarized in Table III.

The first column was operated at 40°C; the second column was not heated. With methyl iodide in the air stream, the iodine decontamination factor was about $3.5 \times 10^5$ at an air flow rate of 5 liters/min.; this decreased to $1.3 \times 10^4$ and 417, respectively, as the air flow rate was increased to 10 and 15.5 liters/min. At the highest flow rate, most of the iodine in the effluent gas was apparently untrapped methyl iodide; as expected, the second column was ineffective in trapping iodine in this form.

TABLE III

| Run No. | Iodine Species in Air Stream | Air Flow (liters/min.) | First Column Temperature (°C)$^a$ | HNO$_3$ Concentration (M) | | | Iodine Decontamination Factor | | |
|---|---|---|---|---|---|---|---|---|---|
| | | | | First Column | Second Column Initial | Final | First Column | Second Column | Overall |
| 1 | CH$_3$I | 5 | 40 | 14.8 | 0.01 | 3.9 | $7.1 \times 10^3$ | 55 | $3.9 \times 10^5$ |
| 2 | CH$_3$I | 5 | 40 | 14.5 | 2.0 | 5.3 | $1.7 \times 10^4$ | 21 | $3.5 \times 10^5$ |
| 3 | CH$_3$I | 10 | 40 | 14.1 | 5.3 | 7.9 | $5.5 \times 10^3$ | 2.4 | $1.3 \times 10^4$ |
| 4 | CH$_3$I | 15.5 | 40 | 14.0 | 4.0 | 10.3 | $3.7 \times 10^2$ | 1.1 | $4.2 \times 10^2$ |

$^a$ Refers to the temperature of circulating water in the column jacket; a reflux condenser (15°C cooling water) was mounted above the column.

What is claimed is:

1. A method for removing alkyl iodides from an air stream comprising the steps of contacting said air stream with an aqueous solution of nitric acid at a concentration of from 6 to 14 molar containing mercuric nitrate at a concentration of at least 0.1 molar, at a temperature of from 25° to 80°C, thus sorbing said iodides from said air stream into said solution and removing the sorbed iodide from said solution.

2. The method according to claim 1 wherein said solution contacts said air stream countercurrently in a packed vertical column and comprising the steps of dividing effluent from said column into a first part and a second part, evaporating said first part to precipitate said sorbed iodide as mercuric iodate, said step of evaporating giving off fumes of nitric acid, condensing said fumes to form a nitric acid condensate, combining said condensate with said effluent prior to dividing said effluent, and reintroducing said second part into said column.

3. The method according to claim 2 wherein said air stream passes from said column to a secondary column for further decontamination, and comprising contacting said air stream in said secondary column with a secondary aqueous solution of nitric acid and mercuric nitrate at molarity concentrations of about 0.1 to 1 and 0.005 to 0.02, respectively.

4. The method according to claim 3 wherein said secondary solution further comprises nonradioactive iodine at a concentration of 5 to 50 mg/liter for isotopic dilution.

5. The method according to claim 1 wherein said step of contacting is carried out countercurrently in a column and further comprising the steps of boiling effluent solution from said column under reflux conditions to convert said sorbed iodides to mercuric iodate, thus forming a refluxed solution, dividing said refluxed solution into a first part and a second part, boiling said first part to precipitate mercuric iodate and to give off nitric acid fumes, condensing said nitric acid fumes thus forming a nitric acid condensate, adding said condensate to said effluent solution prior to dividing said effluent solution and recycling said second part to said column.

6. The method according to claim 1 wherein said nitric acid concentration is 8 to 10 molar and said mercuric nitrate concentration is 0.1 to 0.6 molar.

7. The method according to claim 6 wherein said mercuric nitrate concentration is 0.2 to 0.4 molar.

8. The method according to claim 1 wherein said solution has a volume flow rate of 0.3 to 2 percent of the air volume flow rate.

9. The method according to claim 2 wherein said first part is 1 to 15 percent of the volume of said effluent.

* * * * *